United States Patent [19]

Pines et al.

[11] 4,184,004
[45] Jan. 15, 1980

[54] TREATMENT OF TEXTILE FABRICS WITH EPOXY-POLYOXYALKYLENE MODIFIED ORGANOSILICONES

[75] Inventors: Arthur N. Pines, Katonah; Gordon C. Johnson, Armonk; Fannie L. Campbell, Briarcliff Manor, all of N.Y.

[73] Assignee: Union Carbide Corporation, New York, N.Y.

[21] Appl. No.: 899,103

[22] Filed: Apr. 21, 1978

[51] Int. Cl.$^2$ .................... C08G 47/04; D06M 15/66
[52] U.S. Cl. ............................ 428/413; 260/29.2 M; 427/386; 427/387; 427/390 C; 427/392; 428/447; 428/452; 428/474; 428/480; 528/25; 528/26; 528/29; 528/32
[58] Field of Search ................ 427/386, 387, 390 C, 427/392; 260/29.2 M; 528/29, 26, 25, 32; 428/413, 447, 452, 480, 474

[56] References Cited

U.S. PATENT DOCUMENTS

| | | | |
|---|---|---|---|
| 3,248,296 | 4/1966 | Steinbach et al. | 260/29.2 X |
| 3,511,699 | 5/1970 | Johnson et al. | 428/264 |
| 3,620,821 | 11/1971 | Johnson | 427/387 X |
| 3,868,342 | 2/1975 | Magne | 260/29.2 M |
| 3,980,599 | 9/1976 | Kondo et al. | 260/29.2 M |
| 4,046,930 | 9/1977 | Johnson et al. | 260/29.2 X |

OTHER PUBLICATIONS

*Journal of the Textile Institute*, vol. 69, No. 5, p. 153, May 1977.

*Primary Examiner*—Michael R. Lusignan
*Attorney, Agent, or Firm*—Bernard Francis Crowe

[57] ABSTRACT

Organosilicone terpolymers containing a plurality of reactive epoxy groups and a plurality of polyoxyalkylene groups are employed as hydrophilic softening agents for natural and synthetic textile fabrics.

28 Claims, No Drawings

TREATMENT OF TEXTILE FABRICS WITH EPOXY-POLYOXYALKYLENE MODIFIED ORGANOSILICONES

BACKGROUND OF THE INVENTION

The application of softening agents during the finishing of textiles has been practiced for many years. Textile fabrics treated with durable press resin require treatment with softening agents to achieve commercially acceptable hand, strength, and wrinkle recovery.

A number of silicone compounds have been employed as softening agents in the prior art. Usually, these are reactive or non-reactive silicone fluids which are applied in the form of emulsions. They are generally more economical to use than the available organic softening agents.

In some instances, the silicones, which have been employed have contained reactive groups which crosslink on the fabric to achieve a high degree of durability. One such reactive silicone softening agent is an epoxy-modified polydimethyl-siloxane which is described in U.S. Pat. No. 3,511,699. Other such reactive softening agents are two-component systems comprised of silanol endblocked silicone oil emulsions and methyl trimethoxysilane crosslinkers or methyl hydrogen silicone crosslinkers. The two components are premixed immediately prior to their application to the fabric.

The above mentioned reactive silicone fluids which are employed as softening agents and which impart durable softness are hydrophobic in nature. Hydrophobicity is undesirable in many textile applications because it contributes to fabric soiling and it is believed to inhibit washing effectiveness. Moreover, the hydrophobicity of these softening agents inhibits the absorption of body moisture in clothing fabrics, and thus can cause the wearer to experience a damp sensation.

Silicone glycol nonionic type copolymers, such as those described in U.S. Pat. No. 3,992,332, which are hydrophilic in nature, can be blended with anionic phosphate esters and employed as softening agents in fabric laundering. But, these hydrophilic softeners are non-crosslinking. Consequently, the softness which they impart is not highly durable and the softener must be reapplied in subsequent launderings.

The textile art is seeking an effective softening treatment which is at once highly permanent, hydrophilic, and economical to use.

SUMMARY OF THE INVENTION

The present invention provides novel finished textile materials and methods for imparting a soft, hydrophilic finish thereto. The textile treatment of this invention can be used alone or in conjunction with other known treatments, such as the application of durable press resins.

The treatment of this invention involves applying to textile fabrics at least a softening amount of a hydrophilic organosilicone terpolymer which contains a plurality of reactive epoxy groups and a plurality of polyoxyalkylene groups, as described in more detail hereinafter. While not wishing to be bound by a particular theory of the mechanism, it is believed that the epoxy groups cause the softening agent to crosslink, primarily with the fabric, by reaction with complementarily reactive groups in the molecules of the fabric. Some of the epoxy groups may also react with hydroxyl groups that are generated on the organosilicone molecule itself through the reaction of epoxy groups with reactive groups on the fabric; or, if desired, with added crosslinkers. Suitable crosslinkers are known to those skilled in the art. The hydrophilicity of the softening agent is believed to be derived primarily from the pendent polyoxyalkylene groups.

DETAILED DESCRIPTION OF THE INVENTION

The hydrophilic organosilicone softening agent of this invention is described by the general formula:

$$MD_xD'_yD''_zM \qquad (I)$$

wherein M, in each occurrence, is an end-capping unit of the formula $A_3SiO_{\frac{1}{2}}$ in which each A, individually, is a monovalent organic radical free of olefinic unsaturation, such as a monovalent hydrocarbon radical, preferably alkyl having from 1 to 13 carbon atoms, or a hydrocarbyloxy in which the hydrocarbyl moiety is free of olefinic unsaturation and is preferably alkoxy containing from 1 to 13 carbon atoms, or a hydroxyl-terminated radical which is bonded to the silicon through a 1 to 13 carbon chain; or A is hydroxyl bonded directly to the silicon atom; or the M groups can be—in one or both occurrences—alkoxy of 1 to about 13 carbon atoms.

In formula I, above, D represents a unit of the formula $R_2SiO$ wherein R, in each occurrence, is a monovalent hydrocarbon radical free of acetylenic unsaturation. Illustrative of the monovalent radicals represented by R one can mention alkyl groups containing from 1 to 10 carbon atoms such as methyl, ethyl, propyl, butyl, isobutyl, amyl, hexyl, octyl, and decyl; alkenyl groups such as vinyl, allyl, butadienyl, 1-pentenyl and the like; aryl radicals, including fused ring structures, such as phenyl, p-phenyl-phenyl, napththyl, anthryl, and the like; aralkyl radicals such as phenylmethyl and phenylcyclohexyl; alkaryl radicals suchas tolyl, xylyl, ethylphenyl, α or β-methylnaphthyl, and the like; and cycloalkyl radicals such as cyclopentyl, cyclohexyl, and cyclobutyl. Preferred R radicals are alkyl, with methyl being particularly preferred.

In formula I, above, D' represents a unit of the formula RR'SiO wherein R has the same meaning as stated in the definition of D, above, and R' is a polyoxyalkylene unit of the formula

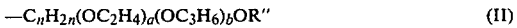

$$-C_nH_{2n}(OC_2H_4)_a(OC_3H_6)_bOR'' \qquad (II)$$

wherein n is an integer having an average value of from 1 to 8; R'' is hydrogen, acyl of 1 to 8 carbon atoms, or a monovalent hydrocarbon radical from 1 to 13 carbon atoms which is free from olefinic unsaturation; and a and b are integers such that the sum of a+b is at least 5 and can be up to about 200, and the quantity $a \div (a+b)$ has a value of from 1.0 to 0; preferably, a and b are integers such that the sum a+b has a value of at least 20 and the quantity $a \div (a+b)$ has a value from 0.25 to 1.0. In formula II, above, the oxyethylene and oxypropylene moieties can be linked in a random chain or in a block chain such as a block chain structure of the AB or ABA type, or a chain having both blocked and random sections.

In formula I, above, D'' is a unit of the formula RR'''SiO, wherein R has the same meaning as stated in the definition of D, above, and R''' is a monovalent organic radical containing at least one vicinal epoxy group of the structure $$-\overset{|}{\underset{|}{C}}\overset{O}{\diagup\diagdown}\overset{|}{\underset{|}{C}}-$$

The monovalent organic radicals represented by R''' which contain epoxy groups are, exclusive of the oxirane oxygen necessarily present, preferably hydrocarbon radicals free of acetylenic unsaturation or containing in addition to carbon and hydrogen only ether or carbonyl oxygen. Such R''' radicals include 3,4-epoxycyclohexyl-6-methyl-3,4-epoxycyclohexyl; 3,4-epoxycyclohexyl-1-ethyl; 9,10-epoxyoctadecyl; γ-glycidoxypropyl; p(2,3-epoxybutyl) phenyl; and 3-(2,3-epoxybutyl) cyclohexyl. The vicinal epoxy group can be, but need not be, a terminal group of the R''' radical.

Because of the ready availability of precursors and the excellent results obtained using the final product the preferred M and D units of formula I are, respectively, $(CH_3)_3SiO_{\frac{1}{2}}$ and $(CH_3)_2SiO$ and the preferred D'' units are $(CH_3)Si-C_2H_4-\langle\text{cyclohexene epoxide}\rangle$ or $(CH_3)Si\ C_3H_6OCH_2-\overset{|}{\underset{H}{C}}\overset{O}{\diagup\diagdown}CH_2$ In formula I, above, x, y, and z are each integers and have the following average values:
x = 10 to 5,000
y = 1 to x;
z = 1 to 0.5x, provided that
y+z ≦ 0.75x
preferably
x = 25 to 1,000,
y = 1 to 0.5x provided that
z = 1 to 0.25x
y+z ≦ 0.5x
most preferably
x = 50 to 300,
y = 1 to 0.25x,
z = 1 to 0.15x, provided that
y+z ≦ 0.25x The organosilicones of formula I can be readily prepared, among other methods, by the platinum catalyzed addition of an ethylenically unsaturated epoxy compound and an ethylenically unsaturated polyoxyalkylene compound to hydrosiloxanes, the ratio of the reactants being such as to prevent the presence of unreacted, i.e., residual, hydrosiloxane moieties. It is to be understood, however, that trace hydrosiloxane contamination in the organosilicone can be tolerated without unduly affecting the products and processes of this invention, but preferably the organosilicone is hydrosiloxane free.

Preferably, the organosilicone terpolymer employed, as characterized by formula I, is an essentially linear polymer. If desired, however, the polymer may contain a degree of branching. In such a case, the polymer may contain, in addition to the units shown in formula I, up to about 10%, based on the total moles of M, D, D', and D'' units, units of the formula R''''SiO$_{3/2}$, wherein each R'''', individually can be any of the groups within the previously given definitions of R, R' and R'''. Methods for introducing such groups (i.e. R''''SiO$_{3/2}$) into the terpolymer are well known to those skilled in the silicones art. As the skilled worker will also appreciate, for each mole of units R''''SiO$_{3/2}$ present, there must also be present in the polymer an additional mole of end-capping units M.

Typically, the hydroxysiloxane precursor employed in the production of the organosilicone terpolymer has the formula $$MD_x(\underset{H}{\overset{CH_3}{\underset{|}{\overset{|}{Si}}}}O)_{(y+z)}M,$$

the ethylenically unsaturated epoxy compound has the formula $CH_2=CH-\langle\text{cyclohexene epoxide}\rangle$ or $CH_2=CHCH_2OCH_2CH\overset{O}{\diagup\diagdown}CH_2,$ and the ethylenically unsaturated polyoxyalkylene has the formula $CH_2=CHCH(OC_2H_4)_a(OC_3H_6)_bOCH_3,$ wherein M, D, x, y, z, a, and b have the hereinbefore defined meanings.

The unsaturated epoxy compound and the unsaturated polyoxyalkylene compound can be reacted with the hydrosiloxane simultaneously or sequentially. If they are sequentially reacted, care must be taken that the first unsaturated compound reacted with the hydrosiloxane is employed in less than stoichiometric equivalence to the number of SiH groups, so that a sufficient number of unreacted SiH groups remain as grafting sites for the desired amount of the later reacted unsaturated compound.

A catalytically effective amount of chloroplatinic acid, a platinum complex, or platinum on a support are suitable catalysts for the foregoing reaction. Typically, an amount of such catalyst sufficient to provide from about 5 to 50 p.p.m. of platinum, based on the weight of the reactants, is effective. Other hydrosilation catalysts known to those skilled in the art may be employed in the usual catalytically effective concentrations. The reaction can be carried out in a conventional chemically inert solvent and product recovery is by conventional means.

The hydrosiloxanes which are employed in the production of the organosilicone softening agents of this invention are well known in the art, as are the methods for their preparation.

The textile materials which derive benefit from treatment with the organosilicone terpolymer are chiefly those which contain functional groups having active-hydrogen atoms which are coreactive with the epoxy groups of the organosilicone, e.g., —COOH, —NH$_2$, and —OH groups. As illustrative of such textile materials one can mention cotton, wool, and polyester or nylon containing terminal hydroxyl, carboxyl, or amine groups, and blends of these with each other or with different materials that do not necessarily have functional groups that are coreactive with the epoxy. While the maximum benefits of the treatment of this invention are realized on substrates containing the above mentioned functional groups, some benefits can be derived by treating textile materials which do not contain groups that are coreactive with the epoxy. A soft, hydrophilic finish will be imparted to such materials by the treatment of this invention, although the finish may not be as durable as that imparted to materials containing coreactive functional groups.

The organosilicone terpolymers employed herein can be water soluble, water dispersible, or water insoluble. Generally, water solubility is enhanced by increasing the weight ratio of polyoxyalkylene groups (i.e. formula II above) to the silicone backbone in the molecule and by increasing the value of $a \div (a+b)$.

The method of application of the organosilicone to the textile material being treated is any of those conventional in the art for applying other finishing agents. The textile material can be suitably treated by immersing it in a treating bath which is a solution, dispersion, or emulsion containing the organosilicone terpolymer. Excess solution can then be removed from the textile material (e.g. by padding). Other methods of treatment include brushing or spraying.

Suitable treating solutions, dispersions, or emulsions (baths) can contain a diluent and from 0.01 to 10 parts by weight of the above described organosilicone terpolymer per 100 parts by weight of the diluent. Normally, water is employed as the diluent since the other treating steps which are employed in conjunction herewith are conventionally carried out in aqueous media. If desired, however, other diluents can be employed such as alcohols, glycols, glycol ethers, hydrocarbons, halohydrocarbons, ketones, and aqueous solvents. When the organosilicone terpolymer is employed in the form of an emulsion, any of the known surfactants can be employed as emulsifying agents, including the anionic, cationic, nonionic, and amphoteric surfactants. Due to their compatibility with water, the organosilicone terpolymers employed as softening agents in the process of this invention form aqueous treating baths having shear stability which is generally superior to that of treating baths which employ the hydrophobic silicone softeners known in the prior art.

In the process of this invention, the amount of organosilicone terpolymer which is applied to the textile material is at least that which increases the softness thereof and can vary depending on such factors as the desired properties of the final product, economic consideration, compatibility factors, etc. Generally, it is desired the textile material be treated with from 0.01 to 10 parts by weight of the organosilicone terpolymer per 100 parts of textile material. Preferably, the textile material is treated with from 0.05 to 5.0 parts by weight per 100 parts by weight of textile material.

The organosilicone terpolymer which has been applied to the textile material is cured on the material by any suitable means. Preferably, curing is effected by heating the treated textile material at a temperature from about 120° C. to 175° C. If desired, a catalyst can be employed to accelerate curing.

Suitable cure catalysts include the metal salts of strong acids, e.g. zinc nitrate, aluminum sulfate, zirconium acetate, or zinc sulfate, metal halides, e.g. zinc chloride, aluminum chloride, or magnesium chloride; metal soaps, e.g. zinc-2-ethylhexoate, dibutyltin dilaurate or dibutyltin diacetate; and non-polymeric anhydrides, e.g. tetrapropenyl succinic anhydride. The metal salts, halides and soaps are generally employed at a concentration of 0.1 to 10 parts metal/100 parts organosilicone. The anhydride catalysts are generally used at one mole anhydride per mole of epoxy in the organosilicone terpolymer.

Due to the hydrophilic nature of the softening agent of this invention, the textile materials which derive the greatest benefits from this treatment, in terms of improved launderability and soil resistance properties, are those which are formed from inherently hydrophobic fibers (e.g. polyester) or which have been treated with a hydrophobic substance (e.g., certain durable press resins).

In one embodiment of this invention, treatment of the textile material with the organosilicone terpolymer softening agent and treatment with a durable press resin (also known as a "creaseproofing agent" or "textile resin") are carried out together, i.e. in the same bath. The durable press resins are known in the art and include aminoplast resins, epoxides, aldehydes, aldehyde derivatives, sulfones and sulfoxides. Aminoplasts are preferred durable press resins as they are relatively inexpensive. Suitable durable press agents are disclosed in "Crease-proofing Resins for Wash-and-Wear Finishing" by A. C. Nuessle, Textile Industries, Oct. 1959, pp. 1–12.

Typical aminoplast durable press resins include the urea-formaldehyde condensates, e.g. methylolated ureas and alkyl ureas, etc.; melamine-formaldehyde condensates, e.g. tri, tetra and penta methylol and methoxymethyl melamines, etc.; alkylene ureas, e.g., dimethylol ethylene or propylene urea, dihydroxydimethylol ethylene urea and various alkoxymethyl derivatives thereof, etc.; carbamates, e.g. dimethylol alkyl and alkoxyalkyl carbamates, etc.; formaldehyde-acrolein condensation products; formaldehyde-acetone condensation products; alkylol amides, e.g. methylol formamide, methylol acetamide, etc.; alkylol acrylamides, e.g. N-methylol methacrylamide, N-methylol-N-methylacrylamide. N-methylol methylene-bis(acrylamides), methylene bis(N-methylol acrylamide), etc.; diureas, e.g. trimethylol and tetramethylol acetylene diureas, etc.; triazones, e.g. dimethyl N-ethyltriazone, N,N'-ethylenebis(di-methylol triazone), etc., urons, e.g. dialkoxymethyl uron, etc., and the like.

Typical epoxide durable press resins include the diglycidyl ethers of polyols such as ethylene glycol diglycidyl ether and diepoxides such as vinyl cyclohexene dioxide. Typical aldehyde creaseproofing agents include formaldehyde, glyoxal and alpha-hydroxypivaldehyde. Typical aldehyde derivative creaseproofing agents include 2,4,6-trimethylol phenol, tetramethylol acetone, diethylene glycol acetal and pentaerytheritol bis acetal.

When the durable press resin and organosilicone terpolymer softening agent are applied to the textile material from a single bath, a cure catalyst for the durable press resin is generally employed. The choice of catalyst is governed by the particular durable press resin. By way of illustration, catalysts such as magnesium chloride, zinc chloride, zinc nitrate, zirconium acetate, and amine hydrochlorides can be used with aminoplasts; catalysts such as hydrochloric acid can be used with aldehydes; alkaline catalysts can be used with aldehyde derivatives; and catalysts such as sodium hydroxide can be used with sulfones. The cure of the durable press resin is usually effected at an elevated temperature (e.g. from 150° C. to 175° C.) and the durable press resin and organosilicone terpolymer softening agent can conveniently be simultaneously cured. Moreover, a single cure catalyst, suitable for curing both the organosilicone terpolymer and the durable press resin, can be used.

The treatment of this invention can be employed in conjunction with any other treating steps and treating materials which are conventionally employed in the textile finishing art.

The following examples are intended to further illustrate the invention which is described above and are not intended to unduly limit the scope of the invention.

In the example which follow, the terms, abbreviation, etc., given in the left hand column below have the meanings indicated in the right hand column.

| Term | Meaning |
| --- | --- |
| calc. | calculated value |
| cc. | cubic centimeters |
| $C_2O$ | the epoxy group, 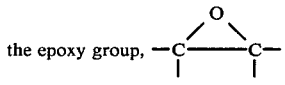 |
| DP | durable press |
| dupl. | duplicate experiment |
| Epoxy-functional Silicone Control | A commercially available hydrophobic epoxy-functional silicone softener of the prior art, having the formula $MD_{243}D_7'$ M wherein $M = Me_3SiO_{\frac{1}{2}}$ $D = Me_2SiO$ $D' = $ 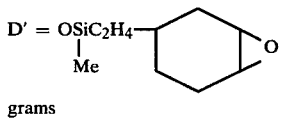 |
| g. | grams |
| Me | methyl group |
| ml. | milliliters |
| M.W. | molecular weight |
| $n_D^{25}$ | index of refraction at 25° C. (or other temperature indicated by superscript) at the D sodium line wavelength. |
| O.W.F. | a basis for measuring amount of treating agent picked up by fabric, basis being weight of nonvolatile solids deposited on the fabric per unit weight of untreated fabric |
| p.p.m. | parts per million |
| visc. | viscosity |
| wt. | weight |

The fabrics employed in the examples are: 100% cotton 80×80 print cloth (Style #400, Testfabrics, Inc.); and 50/50 weight percent cotton/polyester blend sheeting (Style J-130, bleached, scoured, unfinished, Springs Mills).

Except as otherwise modified in the specific examples, the DP bath used to apply the organosilicone softening agents, as well as durable press resin, was produced by admixing the following components:

| Component | wt.% |
| --- | --- |
| Distilled Water | 84.8 |
| Glacial Acetic Acid | 0.1 |
| Dimethyloldihydroxy Ethylene Urea solution (45% in water) | 12.0 |

| Component | wt.% |
| --- | --- |
| Zinc Nitrate solution (25% in water) | 2.5 |
| Organosilicone Softening Agent | 0.6 |

In some instances, the organosilicones were provided to the DP bath in the form of solutions in organic solvent or aqueous emulsions, and it is so indicated in the examples. In such instances, the weight percentage of organosilicone indicated above is based only on the actual amount of organosilicone exclusive of its solvent, water of emulsion, surfactants, etc.

The fabrics were treated with the DP bath containing the organosilicone softening agents by the following procedure, hereinafter referred to as the "laboratory dip/pad/dry/cure" method:

The fabric was wet in the DP bath. The wet fabric was padded, with the pad rolls set at approximately 50 p.s.i.g. to provide 90% wet pick-up of the treating bath. The padded treated fabric was stretched on a frame and dried for 3 minutes at 110° C. in a forced-draft oven. Final cure was then achieved by heating for 5 minutes at 160° C. in a forced-draft oven. The fabric was then conditioned at least 16 hours at 50% relative humidity and 70° F. prior to testing.

The following procedures were employed to test for the indicated properties.

| Property | Procedure |
| --- | --- |
| Wrinkle Recovery | AATCC Test Method 66-1972 (Recovery angle method) |
| Tear Resistance (Elmendorf) | ASTM D1424-63 |
| Water Absorption | Examples 3 & 5: Sample is stretched over a 6-inch embroidery hoop. A drop of water is placed on the surface. Using a stopwatch, the time in sec. for wetting to begin and the time for the drop to be completely absorbed is noted. Example 11: AATCC-39-1974. |
| Shear Stability of DP bath containing organosilicone softener | (a) A 10-ml. buret is filled with a solution containing 1,000 p.p.m. silicon per ml. (certified atomic absorption standard silicon reference solution, Fisher Scientific Co.) Standard solutions are prepared to correspond to anticipated high and low ranges of silicon plus one or two points in between by diluting the proper volume of reference solution with distilled water. (b) A 100-gram DP bath, having the previously given composition, is prepared. (c) A 100-ml. volumetric flask is filled with 70-80 ml. of distilled eater, 1 ml. of DP bath is transferred to the flask, and the flask is filled to the 100-ml. mark with distilled water and mixed thoroughly. (d) The diluted DP bath sample is placed in the mixing jar of a Waring blender (model no. 91263) and sheared for 5 minutes 12,000 rpm. (12,000 rpm. is obtained using a variac power controller and low speed setting on the blender). (e) The sheared bath is poured into a 250-ml. beaker, which is |

| Property | Procedure |
|---|---|
| | inclined at a 45° angle. A 1-ml. sample is removed from the bottom of the beaker as soon as there is a liquid layer free of foam. The sample is diluted to 100 ml. with distilled water and mixed thoroughly. (f) Si content of the sheared and unsheared samples are determined by atomic absorption spectrophotometer. Shear Stability Index is reported as the ratio of p.p.m. Si in the sheared sample to that in the unsheared sample. |
| Wt. % Si. | Organosilicone Treated Fabric: Sample is charred with fuming $H_2SO_4$. Residue is treated with ammonium molybdate which generates yellow characteristic of silicon molybdate. Si content is determined by measuring color intensity using a spectrophotometer. Organosilicone Terpolymer: Sample is treated with fuming $H_2SO_4$, leaving a silica residue, which is weighed. The residue is treated with HF, which volatilizes the silica. Any remaining residue is weighed and the Si content calculated from the weight loss. |
| Wt. % $C_2O$ | By the 100° C. acid cleavage method. |
| SiH content | Hydrosiloxane fluid is reacted with 25% alcoholic KOH, releasing hydrogen. SiH content is reported as cc. $H_2$ generated per g. of hydrosiloxane. |

EXAMPLE 1

There was prepared 0.2 mole of a hydrosiloxane of the average formula:

$$Me_3SiO(Me_2SiO)_{200}(MeSiO)_{10}SiMe_3.$$
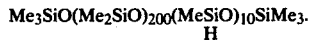

To a 500-cc., 3-neck, round-bottom flask fitted with a mechanical agitator there were charged 19.2 g. $Me_3SiO(Me_2SiO)_3SiMe_3$, 291.6 g. $[Me_2SiO]_4$ and 12.62 g.

$$Me_3SiO(MeSiO)_{40}SiMe_3.$$
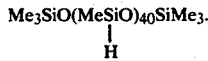

The mixture was stirred vigorously for 2 hours with 6.5 g. $H_2SO_4$ during which period equilibration occurred. The hydrosiloxane product was neutralized by treatment with 20 g. $NaHCO_3$ overnight and filtered. The filtered compound had the following properties:

SiH content (cc. $H_2$/g.) = 14.6
$n_D^{25} = 1.4022$
viscosity (cstks. at 25° C.) = 328

Using the hydrosiloxane thus produced as a precursor, there was prepared an organosilicone terpolymer within the scope of formula I having the general formula $MD_{200}D_6'D_4''M$. The apparatus used to produce the hydrosiloxane was modified to include a thermometer, nitrogen inlet tube, reflux condenser, and heating mantle. There were charged to the flask 100 g. toluene; 75.6 g.

$CH_2=CH(OC_2H_4)_{18}(OC_3H_6)_{20.5}OMe$; 

2.73g. $CH_2=CH-$ 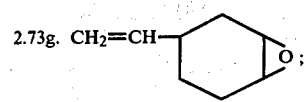

and 78.4 g. of the hydrosiloxane. The reactants were heated for 1.5 hours at 75° C. with nitrogen purging through the head space. The temperature of the reactants was then raised to 84° C. and 25 p.p.m. Pt were added as chloroplatinic acid in dimethyoxyethane. Within 2 minutes after catalyst addition, the flask contents became compatible and the temperature reached 93° C. The temperature was maintained at this level for 1 hour. The reaction product was then neutralized by treatment with $NaHCO_3$ overnight, filtered through a 5μ pressure pad and stripped of solvent at 70° C. at a pressure of less than 0.5 mm. Hg. The product had the following properties:

| | |
|---|---|
| wt. % Si = | 18.95 (found) |
| | 19.03 (calc.) |
| wt. % epoxy = | 0.5 (found) |
| | 0.51 (calc.) |

$n_D^{24} = 1.4324$
viscosity (cps. at 22° C.) = 8,400

EXAMPLE 2

Using the hydrosiloxane precursor produced in Example 1, an organosilicone terpolymer of the general formula $MD_{200}D_6'D_4''M$ was produced by a procedure similar to that of Example 1, with the exceptions that 2.5 g. allylglycidyl ether were employed in place of the vinyl cyclohexene monoepoxide of Example 1, and only 46.8 g. of toluene were employed as a reaction solvent. The desolvated, filtered organosilicone product had the following properties:

| | |
|---|---|
| wt. % Si = | 19.2 (found) |
| | 19.03 (calc.) |
| wt. % epoxy = | 0.5 (found) |
| | 0.51 (calc.) |

$n_D^{25.5} = 1.4309$
viscosity (cps. at room temperature) = 8,500

EXAMPLE 3

Using the laboratory dip/pad/dry/cure method, the organosilicone terpolymers produced in Examples 1 and 2 were applied to textile materials from a DP bath as hydrophilic softening agents. The organosilicones were applied to 100% cotton print cloth and to a 50/50 weight blend of cotton and polyester. The Epoxy-functional Silicone Control was applied in the same manner to the same fabrics as a control. The treated fabrics were evaluated for softness, water absorbancy, and durability and the treating baths were tested for shear stability. The results appear in the table below. It can be seen that the organosilicone softening agents of this invention produced soft hydrophilic finishes from a DP bath that was notably more shear stable than the bath containing the commercial control softener, which provided a hydrophobic finish.

| Organo-silicone softener | Water Absorbance | | Durability | | Bath Shear Stability Index | soft ness |
|---|---|---|---|---|---|---|
| | Cotton | Cotton Polyester | Cotton | Cotton Polyester | | |
| Control* | >>180 | >>180 | 57 | 44 | 0.67 | Soft |
| Ex. 1** | 6 | 18 | 49 | 50 | 0.93 | Soft |
| Ex. 1 (dupl.) | 0 | — | 55 | — | 0.94 | Soft |
| Ex. 2** | 0 | — | 69 | — | 1.00 | Soft |

*Supplied to DP bath as aqueous emulsion containing 20% softener; 1% surfactant, (mixture of ethoxylated secondary alcohols, Tergitol$^R$ 15-S-3/15-S-15)
**Supplied to DP bath as aqueous emulsion containing 30% softener; 1.5% Surfactant (mixture of ethoxylated secondary alcohols, Tergitol$^R$ 15-S-3/15-S-15)

EXAMPLE 4

Using a procedure similar to that of Example 1, a series of organosilicone terpolymer softening agents within the scope of this invention were prepared by the platinum catalyzed addition of polyoxyalkylene and vinyl cyclohexenemonoepoxide to the appropriate hydrosiloxane. The organosilicone terpolymers are characterized in Table I with respect to their general structure and type and amount of polyoxyalkylene, vinyl cyclohexene monoepoxide and hydrosiloxane employed in their preparation. The amount of toluene used as a reaction solvent is indicated in the table. The physical and chemical characteristics of the organosilicones produced in this example appear in Table II. The hydrosiloxane precursors used to prepare the organosilicones in Table I had the formula $MD_pU_qM$ wherein $M = Me_3SiO_{\frac{1}{2}}$; $D = Me_2SiO$;

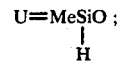

$p$ equals the subscript of D in Table I; and $q$ equals the sum of the subscripts of D' and D'' in Table I. Thus, the hydrosiloxane precursor for Organosilicone no. 1 in Table I is $MD_{100}U_{25}M$

TABLE I

| | Organosilicone structure* | Hydrosiloxane, g. | Polyoxyalkylene, g. | Code** | Vinyl cyclohexene Monoepoxide g. | Toluene, g. |
|---|---|---|---|---|---|---|
| 1 | $MD_{100}D_{10}'D_{15}''M$ | 91.4 | 50.0 | B | 20.46 | 48.6 |
| 2 | $MD_{100}D_{40}'D_6''M$ | 49.0 | 112.3 | A | 1.23 | 48.8 |
| 3 | $MD_{400}D_{12}'D_{16}''M$ | 94.6 | 46.3 | C | 6.55 | 44.2 |
| 4 | $MD_{400}D_{40}'D_{16}''M$ | 99.9 | 60.0 | B | 6.55 | 49.9 |
| 5 | $MD_{100}D_3'D_{1.5}''M$ | 86.3 | 61.7 | A | 1.36 | 44.7 |

*$M = Me_3SiO_{\frac{1}{2}}$    $D = Me_2SiO$

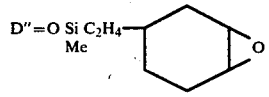

$D'' = O\,Si\,C_2H_4\text{—}$ (structure shown)
      Me $D' = OSiC_3H_6(OC_2H_4)_a(OC_3H_6)_bOMe$
     Me
(see polyoxyalkalene code** below for values of x and y)
**A-a = 18.7; b = 6.3
B-a = 7.5; b = 0
C-a = 17.7; b = 0

TABLE II

| Organosilicone | M.W. calc. | Visc., cps. at 25° C. | $n_D^{25}$ | Composition wt. % (calc.) | | wt. % Si | wt. % $C_2O$ | $H_2O$ Solubility* |
|---|---|---|---|---|---|---|---|---|
| | | | | Silicone$^1$ | Polyether$^2$ | | | |
| 1 | 15,001 | 610 | 1.4405 | 60.9 | 26.7 | 22.5 | 3.7 | I |
| 2 | 89,411 | 13,900 | 1.4478 | 36.5 | 62.6 | 11.1 | 0.2 | S |
| 3 | 43,114 | Solid | — | 73.1 | 22.3 | 25.2 | 1.4 | I |
| 4 | 51,254 | 3,025 | 1.4330 | 65.0 | 31.2 | 23.5 | 1.1 | I |
| 5 | 12,232 | 6,560 | 1.4305 | 64.1 | 34.3 | 21.3 | 0.3 | D |

*I = insoluble
D = disperses
S = soluble
Determined at 1 wt. % organosilicone terpolymer in water, added as a 25 wt. % solution of organosilicone terpolymer in isopropanol.
$^1$Based on hydrosiloxane charged
$^2$Based on ethylenically unsaturated polyoxyalkylene charged

EXAMPLE 5

The organosilicone terpolymers produced in Example 4 were each applied from a DP bath to 100% cotton print cloth and to a 50/50 weight blend of polyester and cotton sheeting by the laboratory dip/pad/dry/cure method. In the case of the organosilicone identified as 5, which was dispersible, but not soluble, this was added to the DP bath in the form of a 25 weight percent solution in isopropanol such that the total amount of organosilicone in the DP bath was as specified in the preceding description of the laboratory dip/pad/dry/cure procedure. In the case of the organosilicones identified as 1, 3, and 4, which were insoluble, the organosilicone terpolymers were added to the DP bath in the form of aqueous emulsions. The emulsion compositions employed are given in the table below. In addition, an aqueous emulsion of the Epoxy-functional Silicone Control was applied as a control softener. The Epoxy-functional Silicone Control is identified as C in the table below.

| Emulsion Compositions | | | |
|---|---|---|---|
| Organosilicone | Emulsifier type* | % Emulsifier | % Organosilicone |
| 1 | I | 2 | 10 |

-continued

Emulsion Compositions

| Organosilicone | Emulsifier type* | % Emulsifier | % Organosilicone |
|---|---|---|---|
| 3 | II | 1 | 10 |
| 4 | III | 0.5 | 10 |
| C | I | 1 | 20 |

*I Mixture of ethoxylated secondary alcohols (Tergitol$^R$ 15-S-3/15-S-15)
II Mixture of alkyl phenols (Tergitol$^R$ NP-35/NPX)
III Polyoxyethylene fatty esters (Brij 30/Brij 35)

The cotton and cotton polyester blend fabrics treated with the organosilicones of this invention, as well as those treated with the Epoxy-functional Silicone Control (identified as C in the table below), were tested for water absorbancy. The results appear in the table below.

| Organo-silicone Code | 100% Cotton | | 50/50 Polyester Cotton | |
|---|---|---|---|---|
| | Begins to wet seconds | Completely Absorbed seconds | Begins to wet seconds | Completely Absorbed seconds |
| 1 | <5 | <30 | 0 | 18 |
| 2 | 0 | <10 | <5 | <30 |
| 3 | 60 | <180 | 60 | <180 |
| 4 | <10 | >180 | 10 | 115 |
| 5 | 0 | <5 | 0 | <15 |
| C | >>180 | >>180 | >180 | >>180 |

The results of this example show that, when the hydrophilic softeners of this invention were employed to treat textile fabrics, the treated fabrics began to wet almost immediately upon exposure to water and in most cases, the water was completely absorbed within 3 minutes. By comparison, the fabrics treated with the conventional Epoxy-functional Silicone softener of the prior art did not even begin to wet within 3 minutes.

EXAMPLE 6

Using procedures similar to those of Example 5, the organosilicone terpolymer softening agents produced in Example 4 were applied to 100% cotton and 50/50 cotton/polyester blend fabrics from DP baths. In addition, the Epoxy-functional Silicone Control was applied to the fabrics as a control softener. The treated fabrics were judged for softness by a five member panel. All treated fabrics were judged to be soft. In a series of comparisons, in which the panelists were not told which samples were being judged, each of the fabrics treated with the organosilicones of this invention were compared with the fabric treated with the Epoxy-functional Silicone Control for softness. The consensus results appear in the table below. The symbols "+," "=," and "−" in the table indicate, respectively, greater than, equal to, or less than the control in softness.

| Organosilicone Code | 100% Cotton Consensus | 50/50 Cotton/Polyester Consensus |
|---|---|---|
| 1 | + | + |
| 2 | − | − |
| 3 | + | + |
| 4 | = | + |
| 5 | − | + |

EXAMPLE 7

DP baths were prepared containing several of the organosilicone softening agents of this invention that were prepared in Example 4. In addition, a DP bath was prepared which contained the Epoxy-functional Silicone Control. The DP baths consisted of: 0.1% glacial acetic acid; 12% dimethyloldihydroxy ethylene urea resin (45% active in water); 2.5% of zinc nitrate (25% in water) as resin catalyst; 0.6% organosilicone softener; and water as the balance. Where necessary, the organosilicones were provided to the DP bath in the form of solutions in isopropanol or aqueous emulsions in an amount sufficient to provide the 0.6% organosilicone in the DP bath. The organosilicone emulsion compositions employed are the same as those used in Example 6.

The DP baths were tested for shear stability for 5 minutes at 12,000 rpm. Results appear in the table below. The Epoxy-functional Silicone Control is identified as C in the table. It can be seen that the DP baths containing the organosilicone terpolymers of this invention were more shear stable than the bath containing the control silicone of the prior art.

| Organosilicone Code | p.p.m. Si ratio |
|---|---|
| 2 | 0.78 |
| 3 | 0.91 |
| 5 | 0.95 |
| C | 0.69 |

EXAMPLE 8

Using a procedure similar to that of Example 5, 100% cotton and 50/50 cotton/polyester blend fabrics were treated in DP baths containing organosilicone terpolymers of Example 4. In addition, a set of fabrics was treated with a DP bath containing the Epoxy-functional Silicone Control, which is identified in the table below by the Code C. Each of the treated fabrics was tested in the following manner to determine the durability of the softening agent on the fabric.

About 75 ml. of methyl isobutyl ketone was placed into a 125 ml. flask fitted with a Soxhlet extractor. A 2–3 gram sample of the treated fabric was placed in the extractor. A condenser was then attached and heat applied to the flask. Each sample was run through three extraction cycles. The sample was then removed and analyzed for silicon content. Unextracted treated fabric samples were also analyzed for silicon content. Silicon content of the treated fabric is converted to silicone content by the following equation, which is derived using the weight percentage of silicon in linear polydimethylsiloxane (i.e. 37.5%).

$$\% \text{ silicone} = \frac{\% \text{ Si} \times 100\%}{37.5\%}$$

The silicone content of the treated fabric is converted to % organosilicone terpolymer by the equation % Organosilicone terpolymer on fabric =
$$\frac{\% \text{ Silicone on fabric} \times 100\%}{\% \text{Silicone in Organosilicone terpolymer*}}$$

*See Table II

Durability of the finish is calculated according to the equation $$\% \text{ Durability} = \frac{\% \text{ Organosilicone after extraction} \times 100\%}{\% \text{ Organosilicone before extraction}}$$

The durability of the softening agents to methyl isobutyl ketone is presented in the table below. It can be seen that the organosilicone terpolymer softening agents of this invention were generally more durable to extraction than the Epoxy-functional silicone softening agent of the prior art which was employed as a control. It was somewhat surprising that the organosilicone softening agent containing epoxy groups and polyoxyalkylene groups imparted a more durable finish than the softening agent which contained only epoxy groups.

The 50/50 Polyester/Cotton fabric was also treated with a second control organosilicone copolymer containing polyoxyalkylene groups, but containing no epoxy groups. This organosilicone copolymer, identified as C-1 in the table below, had the formula $MD_{150}U_{9.75}M$ wherein $M=Me_3SiO_{\frac{1}{2}}$; $D=Me_2SiO$; and $U=OSi_{Me}C_2H_4(OC_2H_4)_{13}(OC_3H_6)_{14.8}O_{Me}$. It can be seen from the table that the durability of the fabric treated with this organosilicone was less than that of the fabrics treated with the terpolymer softeners of this invention.

treated in DP baths containing organosilicone terpolymers of Example 4. In addition, a set of fabrics was treated with a DP bath containing the Epoxy-functional Silicone Control (identified in the table below by the Code C) as a control softener. Each of the treated fabrics was tested for wrinkle recovery, tear strength, and flex abrasion. Results appear in the table below.

| | 100% Cotton | | | | | 50/50 Polyester Cotton | | | | |
|---|---|---|---|---|---|---|---|---|---|---|
| | Wrinkle Recovery Angle, degrees | | Tear Strength grams | | Flex Abrasion Cycles to | Wrinkle Recovery Angle, degrees | | Tear Strength grams | | Flex Abrasion Cycles to |
| Copolymer Code | Warp | Fill | Warp | Fill | Rupture[1] | Warp | Fill | Warp | Fill | Rupture[1] |
| 1 | 138 | 139 | 560 | 340 | 850 | 152 | 152 | 1900 | 1800 | 6100 |
| 2 | 133 | 130 | 500 | 320 | 1000 | 152 | 150 | 1950 | 1950 | 4750 |
| 3 | 139 | 135 | 480 | 320 | 1800 | 157 | 153 | 2050 | 1900 | 5000 |
| 4 | 143 | 140 | 520 | 340 | 550 | 158 | 155 | 2250 | 2050 | 4800 |
| 5 | 140 | 135 | 520 | 400 | 750 | 149 | 152 | 2300 | 2300 | 5450 |
| C | 139 | 137 | 560 | 340 | 900 | 154 | 152 | 2250 | 2050 | 4900 |

[1]Head: weight ratio
for cotton 2:0.5 lb.
for cotton/polyester 4:1 lb.

EXAMPLE 10

A series of organosilicone terpolymer softening agents having preferred values of x,y,z,a, and b in formulas I and II were prepared by the platinum catalyzed addition of ethylenically unsaturated polyethers and vinyl cyclohexane monoepoxide to hydrosiloxanes. The hydrosiloxanes were produced by a procedure similar to that used in Example 1. Table III, below, gives the structural formulas of the organosilicone terpolymers produced, as well as the type and amount of polyether and the amount of vinyl cyclohexane monoepoxide and hydrosiloxane employed in their production, and amount of toluene used as a reaction solvent. Table IV gives the physical and chemical properties of the organosilicone terpolymers.

| | 100% Cotton | | | 50/50 Cotton/Polyester | | |
|---|---|---|---|---|---|---|
| Organosilicone Code | Original Silicone Add-on to Fabric % OWF | Silicone Remaining after MIBK Extraction % OWF | % Durable | Original Silicone Add-on to Fabric % OWF | Silicone Remaining After MIBK Extraction % OWF | % Durable |
| 1 | 0.62 | 0.53 | 85 | 0.75 | 0.40 | 54 |
| 2 | 0.61 | 0.47 | 77 | 0.68 | 0.61 | 90 |
| 3 | 0.55 | 0.39 | 71 | 0.55 | 0.33 | 60 |
| 4 | 0.51 | 0.37 | 73 | 1.07 | 0.94 | 88 |
| 5 | 0.62 | 0.32 | 52 | 0.65 | 0.39 | 60 |
| C | 0.75 | 0.43 | 57 | 0.61 | 0.27 | 44 |
| C-1 | — | — | — | 0.65 | 0.23 | 36 |

EXAMPLE 9

Using a procedure similar to that of Example 5, 100% cotton and 50/50 cotton/polyester blend fabrics were

TABLE III

| Organosilicone structure* | Hydrosiloxane, g. | Polyoxyalkylene, g. | Code** | Vinyl Cyclohexene Monoepoxide,g. | Toluene, g. |
|---|---|---|---|---|---|
| A $MD_{100}D_6'D_{2.5}''M$ | 72.9 | 98.8 | F | 3.07 | 52.4 |
| B $MD_{100}D_6'D_{2.5}''M$ | 40.5 | 139 | H | 1.71 | 54.4 |
| C $MD_{150}D_6'D_{3.75}''M$ | 47.5 | 76.1 | G | 2.05 | 37.7 |
| D $MD_{50}D_2'D_{1.25}''M$ | 48.8 | 76.1 | G | 2.05 | 38 |

TABLE III-continued

| Organosilicone structure* | Hydrosiloxane, g. | Polyoxyalkylene, g. | Code** | Vinyl Cyclohexene Monoepoxide, g. | Toluene, g. |
|---|---|---|---|---|---|
| E MD$_{100}$D'$_{2.5}$M | 52.64 | 123.7 | G | 2.22 | 53.6 |

*M = Me$_3$SiO$_{\frac{1}{2}}$
D = Me$_2$SiO
D" = O Si C$_2$H$_4$
         |
         Me
D' = Me
     |
     Si C$_3$H$_6$(OC$_2$H$_4$)$_a$(OC$_3$H$_6$)$_b$OMe
(see polyoxyalkylene code** below for values of a and b)
**F — a = 13; b = 14.8
G — a = 23; b = 26.1
H — a = 33.9 b = 38.6

TABLE IV

| Organosilicone | M.W., calc. | Visc., cps. at 25° C. | $n_D^{23}$ | Composition wt. % Silicone | Composition wt. % Polyether | H$_2$O solubility* |
|---|---|---|---|---|---|---|
| A | 17,409 | 1,260 | 1.4370 | 46.5 | 51.7 | D |
| B | 31,209 | 26,000 | 1.4465 | 25.9 | 73.1 | S |
| C | 27,943 | 14,500 | 1.4394 | 42.5 | 55.8 | S |
| D | 9,421 | 34,500 | 1.4385 | 43.2 | 55.2 | S |
| E | 24,008 | 7,000 | 1.4430 | 33.7 | 65.0 | S |

*I = insoluble
D = dispersible
S = soluble
Determinations made at 1 wt. % organosilicone terpolymer in water, added as a 25 wt. % solution of organosilicone terpolymer in isopropanol.

EXAMPLE 11

A series of DP baths were produced which incorporated the organosilicone terpolymers produced in Example 10 as softening agents. In the case where the organosilicone was dispersible, it was provided to the DP baths in the form of a dispersion in a manner similar to that described in Example 5. Each of the DP baths was employed to treat a 50/50 weight blend of cotton and polyester by the laboratory dip/pad/dry/cure method. As a control, the fabrics were also treated with the same aqueous emulsion of the Epoxy-functional Silicone Control which was employed as a control in Example 5.

The treated fabrics were tested for water absorption and durability. The treated fabrics were also compared against the control treated fabrics for softness, using a procedure similar to that of Example 6. The treating baths containing each of the softening agents were tested for shear stability. Results appear in the table below.

| Organosilicone | Softness* Consensus | Water Absorption, seconds | Shear Stability, p.p.m. Si ratio | % Durable |
|---|---|---|---|---|
| A | + | <1 | 1.0 | 40 |
| B | − | <2 | 1.0 | 74 |
| C | = | <1 | 0.917 | 51 |
| D | − | <1 | 1.0 | 38 |
| E | = | <1 | 1.0 | 58 |
| Control |  | 228 | 0.75 | 43 |

*Compared with control

What is claimed is:

1. A process for imparting a durable, soft, hydrophilic finish to a textile material which comprises:
   (A) applying to said textile material, in an amount sufficient to improve the softness thereof, an organosilicone terpolymer of the formula MD$_x$D$_y$'D"$_z$M wherein M, in each occurrence, is an end-capping unit of the formula A$_3$SiO$_{\frac{1}{2}}$ in which A is a monovalent organic radical free of olefinic unsaturation or hydroxyl bonded directly to the silicon atom, or M is alkoxy of 1 to 13 carbon atoms; D is a unit of the formula R$_2$SiO wherein R is a monovalent hydrocarbon radical free of acetylenic unsaturation; D' is a unit of the formula RR'SiO wherein R is a monovalent hydrocarbon radical free of acetylenic unsaturation and R' is a polyoxyalkylene unit of the formula —C$_n$H$_{2n}$(OC$_2$H$_4$)$_a$(OC$_3$H$_6$)$_b$OR"

in which R" is hydrogen, acyl of 1 to 8 carbon atoms or a monovalent hydrocarbon radical from 1 to 13 carbon atoms, n is an integer having an average value from 1 to 8, and a and b are integers such that the sum of a+b is from 5 to 200 and the quantity a÷(a+b) is from 1.0 to 0; D" is a unit of the formula RR'"SiO wherein R is a monovalent hydrocarbon radical free of acetylenic unsaturation and R'" is a monovalent organic radical containing at least one vicinal epoxy group; x is an integer having an average value of from 10 to 5,000; y is an integer having an average value from 1 to x; and z is an integer having an average value of from 1 to 0.5x; provided that the sum y+z is not greater than 0.75x; and
   (B) curing the organosilicone terpolymer on the textile fabric.

2. Process as claimed in claim 1 wherein said organosilicone terpolymer is applied to said textile material in an amount from 0.1 to 10 parts by weight of organosilicone terpolymer per 100 parts of untreated textile material.

3. Process as claimed in claim 1 wherein said organosilicone terpolymer is applied to said textile material in an amount from 0.5 to 5 parts by weight of said organosilicone per 100 parts of said textile material.

4. Process as claimed in claim 1 wherein x has a value from 25 to 1,000; y has a value from 1 to 0.5x; and z has a value from 1 to 0.25x; provided that the sum y+z is not greater than 0.5x.

5. Process as claimed in claim 1 wherein x has a value from 50 to 300; y has a value from 1 to 0.25x; and z has a value from 1 to 0.15x; provided that the sum y+z is not greater than 0.25x.

6. Process as claimed in claim 1 wherein a and b are integers such that the value of $a \div (a+b)$ is from 0.25 to 1.0.

7. Process as claimed in claim 1 wherein the sum a+b has a value of at least 20.

8. Process as claimed in claim 1 wherein D'' has the structure

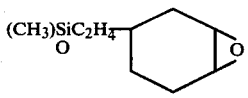

9. Process as claimed in claim 1 wherein D'' has the structure

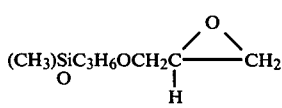

10. Process as claimed in claim 1 wherein said organosilicone terpolymer is applied by immersing said textile material in an aqueous bath containing from 0.1 to 10 parts by weight of the organosilicone terpolymer per 100 parts by weight of water.

11. Process as claimed in claim 10, wherein there is further present in said aqueous bath a durable press resin and a curing catalyst for the durable press resin.

12. Process as claimed in claim 1 wherein curing is effected by heating the organosilicone terpolymer on the textile material at a temperature from 120° C. to 175° C.

13. Process as claimed in claim 1 wherein said textile material contains at least one material chosen from the group consisting of cotton, polyester and nylon.

14. Process as claimed in claim 1 wherein said organosilicone terpolymer additionally contains up to 10 mole %, based on the total moles of M,D,D', and D'' units present, units of the formula $R''''SiO_{3/2}$ wherein $R''''$ is chosen from the groups defined by R,R' and R''', and an additional mole of end-capping units, M, for each such mole of $R''''SiO_{3/2}$.

15. A textile material having improved durable softness and water absorbancy which is produced by the process of claim 1.

16. A textile material having improved durable softness and water absorbancy which is produced by the process of claim 2.

17. A textile material having improved durable softness and water absorbancy which is produced by the process of claim 3.

18. A textile material having improved durable softness and water absorbancy which is produced by the process of claim 4.

19. A textile material having improved durable softness and water absorbancy which is produced by the process of claim 5.

20. A textile material having improved durable softness and water absorbancy which is produced by the process of claim 6.

21. A textile material having improved durable softness and water absorbancy which is produced by the process of claim 7.

22. A textile material having improved durable softness and water absorbancy which is produced by the process of claim 8.

23. A textile material having improved durable softness and water absorbancy which is produced by the process of claim 9.

24. A textile material having improved durable softness and water absorbancy which is produced by the process of claim 10.

25. A textile material having improved durable softness and water absorbancy which is produced by the process of claim 11.

26. A textile material having improved durable softness and water absorbancy which is produced by the process of claim 12.

27. A textile material having improved durable softness and water absorbancy which is produced by the process of claim 13.

28. A textile material having improved durable softness and water absorbancy which is produced by the process of claim 14.

* * * * *